United States Patent
Watanuki et al.

(10) Patent No.: US 9,261,031 B2
(45) Date of Patent: Feb. 16, 2016

(54) CONTROL DEVICE FOR INTERNAL COMBUSTION ENGINE AND METHOD FOR CONTROLLING INTERNAL COMBUSTION ENGINE

(75) Inventors: Takuo Watanuki, Chiyoda-ku (JP); Hideki Hagari, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 823 days.

(21) Appl. No.: 13/614,743

(22) Filed: Sep. 13, 2012

(65) Prior Publication Data

US 2013/0282256 A1 Oct. 24, 2013

(30) Foreign Application Priority Data

Apr. 20, 2012 (JP) .................................. 2012-096452

(51) Int. Cl.
| | |
|---|---|
| B60T 7/12 | (2006.01) |
| F02D 23/02 | (2006.01) |
| F02B 37/16 | (2006.01) |
| F02B 37/18 | (2006.01) |
| F02B 39/16 | (2006.01) |
| F02D 41/00 | (2006.01) |
| F02D 41/18 | (2006.01) |
| F02B 33/44 | (2006.01) |

(52) U.S. Cl.
CPC ................ *F02D 23/02* (2013.01); *F02B 37/16* (2013.01); *F02B 37/18* (2013.01); *F02B 39/16* (2013.01); *F02D 41/0007* (2013.01); *F02B 33/44* (2013.01); *F02D 41/18* (2013.01); *F02D 2200/0406* (2013.01); *F02D 2200/0414* (2013.01); *Y02T 10/144* (2013.01)

(58) Field of Classification Search
CPC . F02D 41/0072; F02M 25/07; F02M 25/0706
USPC .......... 701/103, 108; 123/434, 683, 684, 698, 123/568.11, 568.21
See application file for complete search history.

(56) References Cited

U.S. PATENT DOCUMENTS

| | | | | |
|---|---|---|---|---|
| 6,279,551 B1* | 8/2001 | Iwano | ..................... | F02B 37/18 123/564 |
| 2007/0293956 A1* | 12/2007 | Yasui | .................. | F01L 13/0021 700/29 |
| 2015/0113983 A1* | 4/2015 | Yokono | ................... | F02B 37/18 60/605.1 |
| 2015/0240731 A1* | 8/2015 | Yokono | ............... | F02D 41/0007 60/611 |

FOREIGN PATENT DOCUMENTS

| | | |
|---|---|---|
| JP | 9-228848 A | 9/1997 |
| JP | 2009-013922 A | 1/2009 |

* cited by examiner

*Primary Examiner* — John Kwon
(74) *Attorney, Agent, or Firm* — Sughrue Mion, PLLC; Richard C. Turner

(57) ABSTRACT

Provided is a control device for an internal combustion engine, capable of controlling acceleration-response characteristics, performing an operation at an optimal fuel-efficiency point, and learning variation factors in an internal combustion engine provided with a supercharger including a wastegate valve. A target throttle-valve upstream pressure is calculated based on a target charging efficiency and a rotation speed. An exhaust-gas flow rate is calculated based on an air/fuel ratio and an intake-airflow rate. A target compressor driving force is calculated based on a target intake-airflow rate and a target throttle-valve upstream pressure. A wastegate-valve control value is calculated from the exhaust-gas flow rate and the target compressor driving force by using the relationship in which the relation expression expressing the characteristics of the exhaust-gas flow rate and the target compressor driving force depends only on the wastegate-valve control value.

19 Claims, 9 Drawing Sheets

CONTROL DEVICE FOR INTERNAL COMBUSTION ENGINE AND METHOD FOR CONTROLLING INTERNAL COMBUSTION ENGINE

BACKGROUND OF THE INVENTION

1. Field of the Invention

The present invention relates to a control device for an internal combustion engine, for controlling an internal combustion engine provided with a supercharger which includes a turbine provided to an exhaust path and a compressor provided to an intake path.

2. Description of the Related Art

Conventionally, there is known a turbocharger including a supercharger to be mounted to an intake path of an internal combustion engine (hereinafter, referred to simply as "engine"), which is achieved for the purpose of improving an output of the engine. The supercharger moves a turbine by rotating the turbine with an exhaust gas. The turbocharger has a risk of damaging the engine due to a supercharging pressure which becomes higher than needed when the turbine is rotated at a high rpm under a high load. Therefore, in general, an exhaust-gas bypass path is provided at upstream of the turbine so as to divert a part of the exhaust gas flowing through an exhaust path into the exhaust-gas bypass path by a wastegate valve provided to the exhaust-gas bypass path, thereby adjusting the amount of the exhaust gas flowing into the turbine. In this manner, the supercharging pressure is controlled at an appropriate level (for example, see Japanese Patent Application Laid-open No. 9-228848).

Specifically, an exhaust pressure and the supercharging pressure of the supercharger are controlled by an opening degree of the wastegate valve. A control amount of the opening degree of the wastegate valve is determined by closed-loop control for a predetermined target amount of an intake system (for example, a set supercharging pressure or a set intake amount) based on an engine rpm and an engine load or simple open-loop control.

In recent years, the following control device for an internal combustion engine has been proposed. The control device provides good running performance by determining an air amount, a fuel amount, and ignition timing, which correspond to engine control amounts, using an output-shaft torque of the engine, corresponding to a requested value of a driving force by a driver or a vehicle, as a target engine output value.

Further, it is generally known that the control amount which most affects the engine output-shaft torque among all the engine control amounts is the air amount. In this context, a control device for an internal combustion engine, which controls the air amount with high accuracy, has also been proposed (for example, see Japanese Patent Application Laid-open No. 2009-013922).

The conventional wastegate-valve control device described in Japanese Patent Application Laid-open No. 9-228848 controls the opening degree of the wastegate valve by a target amount obtained by a map value previously determined in accordance with each of operation variables. Therefore, if there is: (1) an individual variability, (2) a change with time (deposit accumulation, deterioration of a bearing, or the like), (3) a change in viscosity of an engine oil (change in bearing loss), or (4) an environmental change (a turbine output, a turbine rpm, and a requested compressor driving force differ depending on an atmospheric pressure and a temperature) as a variation factor of the turbocharger, the control device is affected by a variation in control. Therefore, there arises a problem in that an actual operation point greatly deviates from a set operation point.

Moreover, the supercharging pressure is controlled by the opening degree of the wastegate valve. However, the supercharging pressure can also be controlled by an opening degree of a throttle valve. Therefore, for controlling the same supercharging pressure, there exist a plurality of combinations of the opening degree of the wastegate valve and the opening degree of the throttle valve. Thus, there is another problem in that an operation point, at which the optimal fuel efficiency is obtained, cannot be known.

Further, when the conventional wastegate-valve control device described in Japanese Patent Application No. 9-228848 is replaced by the control device for the internal combustion engine, described in Japanese Patent Application No. 2009-013922, which uses the engine output as the target value, the control is also replaced by control for the engine output with respect to an opening degree of an accelerator, that is, control for drivability (=acceleration). Therefore, a plurality of map values are required to be set in accordance with the opening degree of the accelerator as the target amounts of the opening degree of the wastegate valve. Therefore, the operation point also changes. Thus, even in this case, there is a problem in that the setting of the ignition timing and an air/fuel ratio is required to be changed.

SUMMARY OF THE INVENTION

The present invention has been made to solve the problems described above, and therefore has an object to provide a control device for an internal combustion engine provided with a supercharger including a wastegate valve, which is capable of controlling acceleration response characteristics, performing an operation at an optimal fuel-efficiency point, and learning variation factors.

According to an exemplary embodiment of the present invention, there is provided a control device for an internal combustion engine including: a throttle valve provided in an intake path of the internal combustion engine; a supercharger including a turbine provided in an exhaust path and a compressor provided in the intake path on an upstream side of the throttle valve, for rotating integrally with the turbine; a wastegate valve provided in a bypass passage for bypassing the turbine; and a wastegate-valve driving section for driving the wastegate valve to change a flow-path sectional area of the bypass passage, the control device including a wastegate-valve control part including: a target throttle-valve upstream pressure computing section for calculating a target throttle-valve upstream pressure corresponding to a target value of a pressure on the upstream side of the throttle valve based on a target charging efficiency serving as a target value of a charging efficiency of the internal combustion engine and a rotation speed of the internal combustion engine; an exhaust-gas flow-rate computing section for calculating an exhaust-gas flow rate based on an air/fuel ratio of the internal combustion engine and an actual in-cylinder fresh-air amount; a target compressor driving-force computing section for calculating a target compressor driving force based on a target intake airflow rate serving as a target value of an intake airflow rate and the target throttle-valve upstream pressure; and a wastegate-valve opening-degree computing section for calculating a wastegate-valve control value based on the exhaust-gas flow rate and the target compressor driving force, in which the wastegate-valve control part uses a relationship of characteristics of the exhaust-gas flow rate and the target compressor driving force, depending only on the wastegate-valve control value, to calculate the wastegate-valve control value so as to control the wastegate-valve driving section.

Therefore, according to the present invention, in the internal combustion engine provided with the supercharger including the wastegate valve, the control of the acceleration response characteristics, the operation at the optimal fuel efficiency point, and the learning of the variation factors can be performed.

DETAILED DESCRIPTION OF THE PREFERRED EMBODIMENT

Hereinafter, a control device for an internal combustion engine according to the present invention is described in accordance with an embodiment referring to the accompanying drawings. In the embodiment, the same or equivalent parts are denoted by the same reference symbols, and the overlapping description thereof is herein omitted.

First Embodiment

Figure 1:
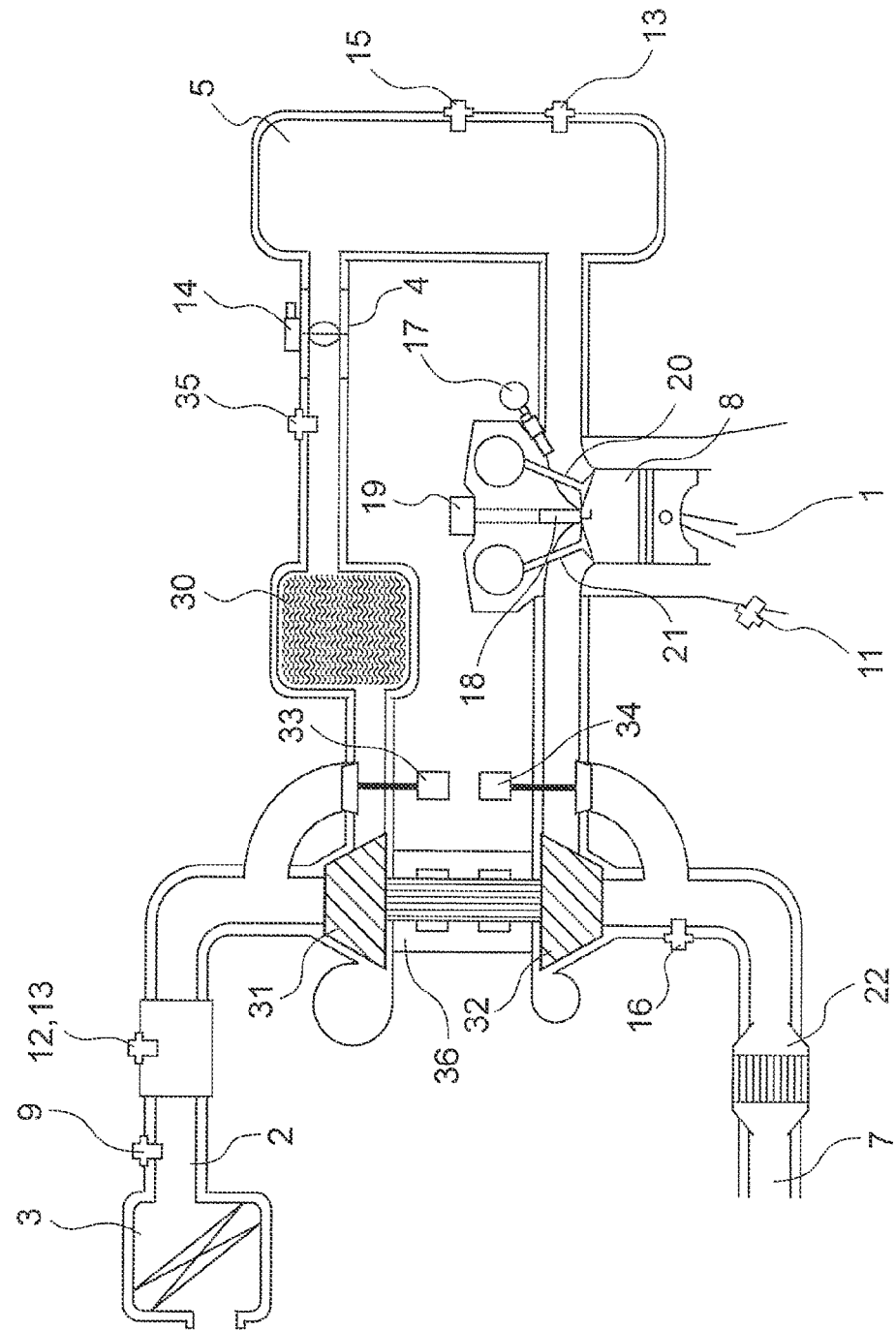
FIG. 1 is a configuration diagram illustrating an intake/exhaust system of an internal combustion engine according to the present invention.

FIG. 1 is a configuration diagram illustrating an intake/exhaust system of an internal combustion engine according to the present invention. In FIG. 1, a crank-angle sensor 11 for generating an electric signal in accordance with a rotation angle of a crank of an internal combustion engine (hereinafter, also referred to simply as "engine") 1 is mounted to the crank. An intake pipe 2 forming an intake path is connected to an inlet port of a combustion chamber of the engine 1, whereas an exhaust pipe 7 forming an exhaust path is connected to an outlet port of the combustion chamber.

An air cleaner 3 for purifying intake outside air is mounted to the intake pipe 2 on an upstream side thereof (opposite to the side where the engine 1 is provided). An airflow sensor 12 and an intake-air temperature sensor 13 are mounted integrally or separately to the intake pipe 2 on a downstream side (on the side where the engine 1 is provided) of the air cleaner 3. The airflow sensor 12 generates an electric signal in accordance with an intake airflow rate. The intake-air temperature sensor 13 generates an electric signal in accordance with an intake-air temperature in the intake path. FIG. 1 illustrates an example where the airflow sensor 12 and the intake-air temperature sensor 13 are configured integrally. An atmospheric-pressure sensor 9 for generating an electric signal in accordance with an atmospheric pressure is provided to the intake pipe 2 on the downstream side (on the side where the engine 1 is provided) of the air cleaner 3.

An exhaust-gas purification catalyst 22 is provided to the exhaust pipe 7 on the upstream side thereof (on the side where the engine 1 is provided). An air/fuel-ratio sensor 16 for generating an electric signal in accordance with a ratio of a combusted fuel and air is provided to the exhaust pipe 7 on the upstream side (on the side where the engine 1 is provided) of the exhaust-gas purification catalyst 22.

In the intake/exhaust system constituted by the intake pipe 2 and the exhaust pipe 7, a compressor 31 and a supercharger (turbocharger) 36 including a turbine 32 which rotates integrally with the compressor 31 are provided. The turbine 32 is provided to the exhaust pipe 7 on the upstream side of the exhaust-gas purification catalyst 22 and is rotationally driven by an exhaust gas flowing through the exhaust pipe 7. The compressor 31 is provided to the intake pipe 2 on the downstream side of the air cleaner 3. The compressor 31 is rotationally driven with the rotation of the turbine 32 to compress the air in the intake pipe.

On the downstream side of the compressor 31, there is provided an air-bypass valve 33 for diverting a part of a compressed air amount into the intake pipe 2 so as to prevent the turbine 32 from being damaged by a reverse flow of a supercharging pressure generated by compression mainly at the time when an accelerator is in the OFF state. On the downstream side of the air-bypass valve 33, an intercooler 30 is provided. On the downstream side of the intercooler 30, a throttle valve 4 for adjusting the air amount to be delivered to the engine 1 is provided. A throttle-valve position sensor 14 for generating an electric signal in accordance with an opening degree of the throttle valve 4 is connected to the throttle valve 4. On the upstream side of the throttle valve 4, a throttle-valve upstream pressure sensor 35 for generating an electric signal in accordance with an air pressure between the intercooler 30 and the throttle valve 4 is provided.

Further, a surge tank 5 for eliminating intake-air pulsations is provided to the intake pipe 2 on the downstream side of the throttle valve 4 provided in the intake path. An inlet-manifold pressure sensor 15 for generating an electric signal in accordance with an air pressure in the surge tank 5 is provided to the surge tank 5. Both the airflow sensor 12 and the inlet-manifold pressure sensor 15 or the inlet-manifold pressure sensor 15 alone may be provided.

When the inlet-manifold pressure sensor 15 alone is provided, the intake-air temperature sensor 13 is provided to the surge tank 5 independently of the inlet-manifold pressure sensor 15, as illustrated in FIG. 1. In place of the inlet-manifold pressure sensor 15 for directly measuring an inlet-manifold pressure Pb, a section for estimating the inlet-manifold pressure Pb based on information from another sensor may be used.

In the intake pipe 2, an injector 17 for injecting a fuel is provided at the downstream of the surge tank 5 on the side where the engine 1 is provided. The injector 17 may also be provided so as to directly inject the fuel into a cylinder 8.

On the top of the cylinder 8, a spark plug 18 and an ignition coil 19 are provided. The spark plug 18 ignites a combustible gas mixture generated by mixture of air sucked into the engine 1 and the fuel injected from the injector 17. The ignition coil 19 generates a current for striking sparks to the spark plug 18. An intake valve 20 and an exhaust valve 21 are also provided. The intake valve 20 adjusts the air amount introduced from the intake path into the cylinder 8. The exhaust valve 21 adjusts the air amount exhaust from the cylinder 8 to the exhaust path of the internal combustion engine.

On the upstream side of the turbine 32, a wastegate valve 34 for diverting a part of the exhaust gas into an exhaust-gas bypass path is provided so as not to damage the engine 1 even if the supercharging pressure increases when the turbine 32 is rotated at a high rpm under a high load.

As a section for driving the wastegate valve 34, any of a pressure type section for controlling a pressure to be applied to a diaphragm and an electric type section for directly instructing an opening degree of the wastegate valve 34 may be used.

Figure 2:
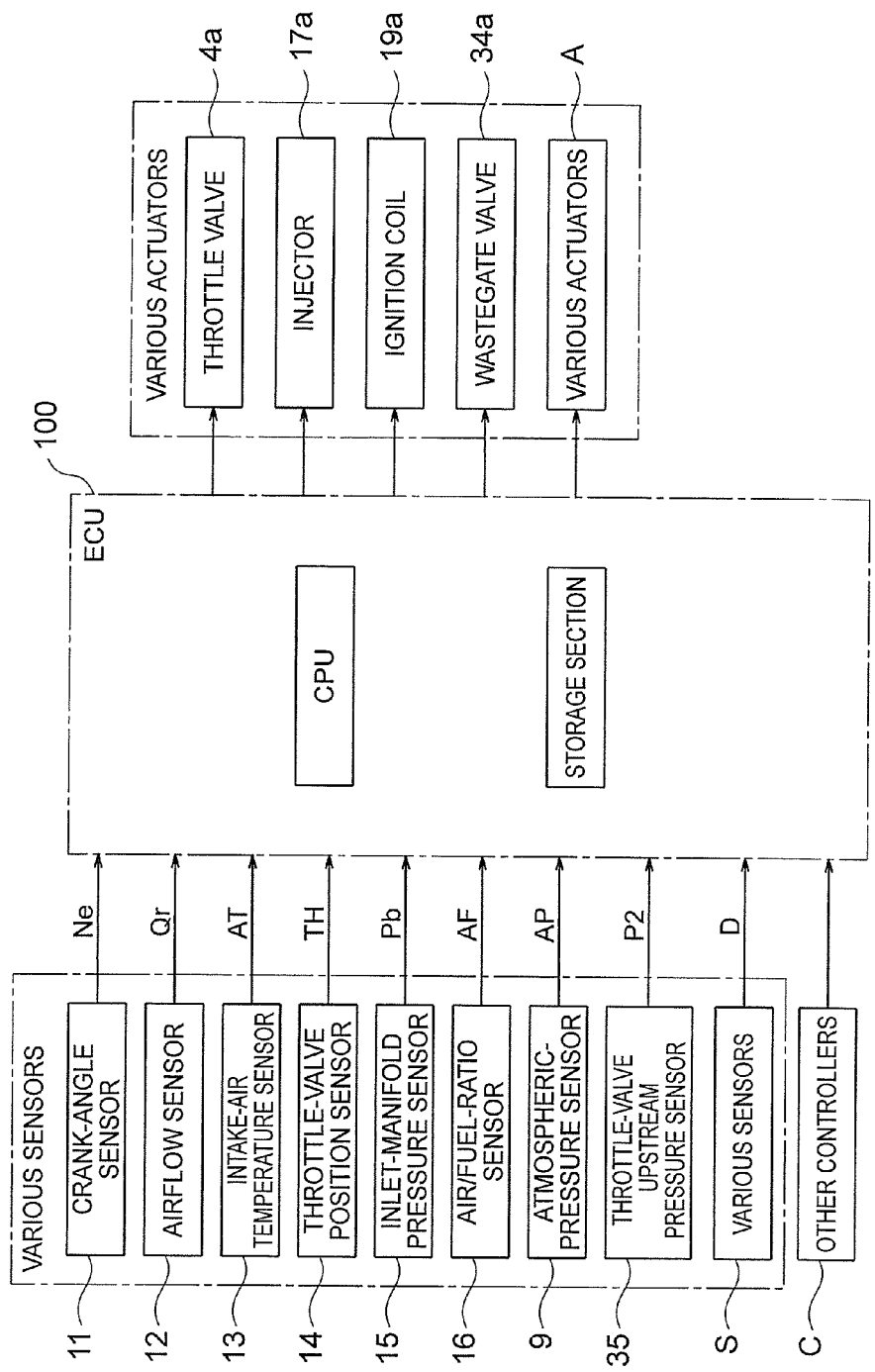
FIG. 2 is a block diagram schematically illustrating a configuration of a control device for the internal combustion engine, according to the present invention.

FIG. 2 is a block diagram schematically illustrating a configuration of a control device for the internal combustion engine, according to the present invention. In FIG. 2, an electronic control unit (hereinafter, abbreviated as "ECU") 100 receives the electronic signals generated respectively by the crank-angle sensor 11, the airflow sensor 12, the intake-air temperature sensor 13, the throttle-valve position sensor 14, the inlet-manifold pressure sensor 15, and the air/fuel-ratio sensor 16.

In FIG. 2, the reference symbol Ne denotes a rotation speed of the crank-angle sensor 11, Qr denotes an actually-measured airflow rate, AT denotes an intake-air temperature, TH denotes the opening degree of the throttle valve 4, Pb denotes the inlet-manifold pressure or an intake-air pressure, and AF denotes the air/fuel ratio.

The ECU 100 receives the electric signals from the atmospheric-pressure sensor 9, the throttle-valve upstream pressure sensor 35, the sensors 11 to 16 described above, and other various sensors S, which are required for the turbocharger. The various sensors S include an accelerator-position sensor or an accelerator opening-degree sensor, each for generating an electric signal in accordance with the amount of operation of an accelerator (not shown), a sensor for controlling combustion in the engine 1, and sensors for controlling behaviors of a vehicle (for example, a vehicle-speed sensor, a water-temperature sensor, and the like).

The reference symbol AP denotes an atmospheric pressure, P2 denotes a throttle-valve upstream pressure, and D denotes an accelerator opening degree.

Further, the ECU 100 calculates an estimated output torque TRQ (not shown) corresponding to an estimate of an actual torque generated from the engine 1 based on input data. The input data includes the rotation speed Ne from the crank-angle sensor 11, the actually-measured airflow rate Qr from the airflow sensor 12, the throttle-valve opening degree TH from the throttle-valve position sensor 14, the inlet-manifold pressure Pb from the inlet-manifold pressure sensor 15, the air/fuel ratio AF from the air/fuel-ratio sensor 16, the atmospheric pressure AP from the atmospheric-pressure sensor 9, the throttle-valve upstream pressure P2 from the throttle-valve upstream pressure sensor 35, and the accelerator opening degree D from the accelerator opening-degree sensor (included in the various sensors S) for detecting the opening degree of the accelerator provided to the vehicle. The ECU 100 also calculates a target output torque TRQt (not shown) based on the input data from the sensors described above and a torque request value from other controllers C (for example, controllers for transmission control, brake control, traction control, and stability control).

In order to achieve the target output torque TRQt, the ECU 100 performs the following control. The ECU 100 controls the driving of an actuator (driving section) 4a of the throttle valve 4 by referring to the air/fuel ratio AF and various target control values (for example, an opening degree at intake/exhaust VVT, an EGR ratio, and ignition timing) so as to achieve a target intake airflow rate Qat for the intake airflow rate. The ECU 100 controls the driving of an actuator (driving section) 17a of the injector 17 so as to achieve a target value of the air/fuel ratio AF. The ECU 100 also controls the energization of an actuator section (driving section) 19a including a driving circuit for the ignition coil 19 so as to achieve a target value for the ignition timing. Further, the ECU 100 controls the driving of an actuator (driving section) 34a of the wastegate valve 34 so as to achieve a target value for the wastegate-valve opening degree. The ECU 100 also calculates target values for various actuators A other than those described above and performs control for the calculated target values.

The ECU 100 includes a microprocessor including a CPU, a ROM, and a RAM. The CPU executes a computation process. The ROM stores program data and fixed-value data. The RAM updates data stored therein and sequentially rewrites the data. A storage section includes the ROM and the RAM.

Figure 3:
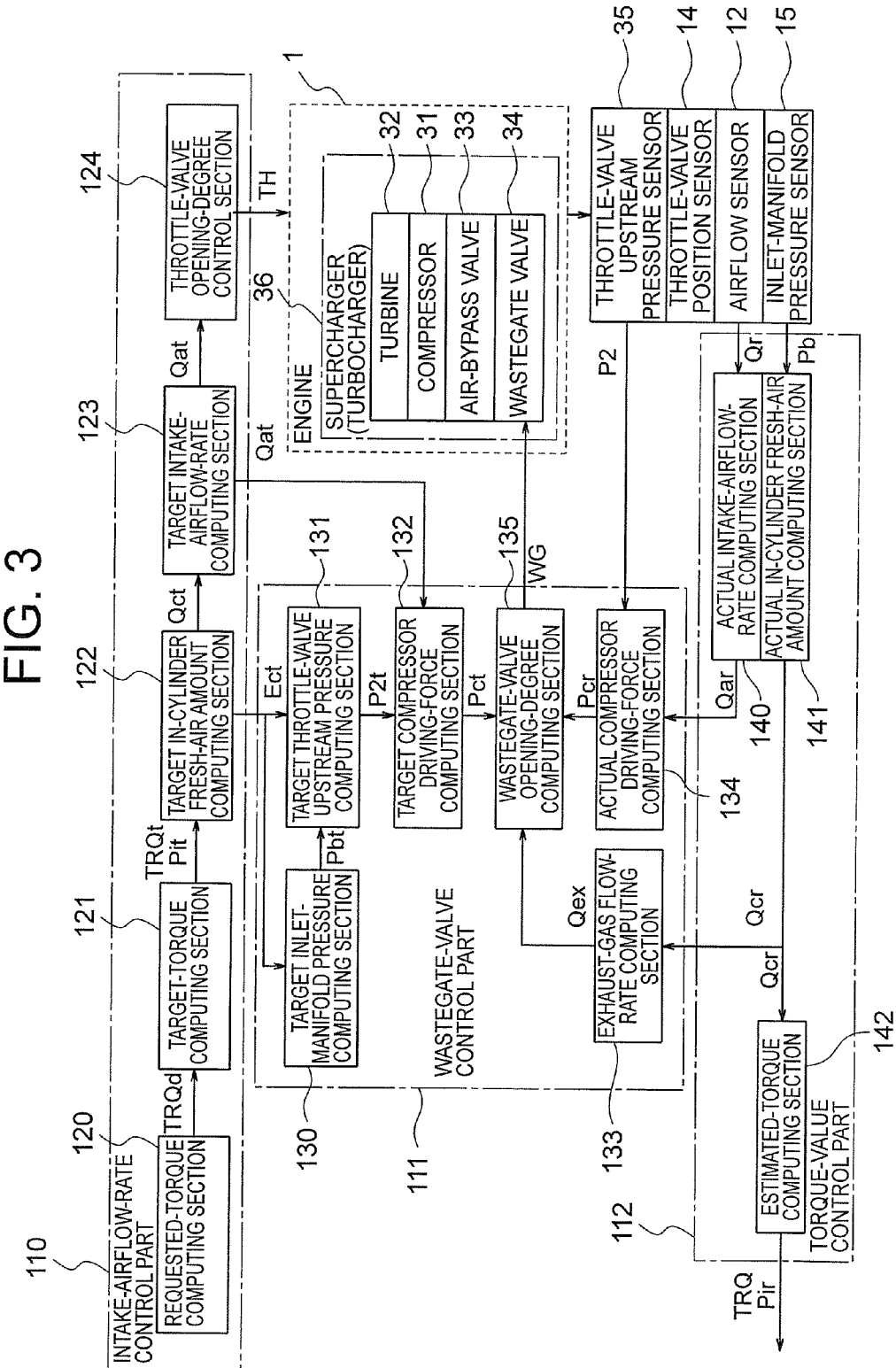
FIG. 3 is a block diagram schematically illustrating functions of an ECU illustrated in FIG. 2.

FIG. 3 is a block diagram specifically illustrating functions relating to intake-airflow-rate control, wastegate-valve control, an estimated-torque computation, and other computations by the ECU 100 illustrated in FIG. 2.

In the ROM of the ECU 100, an intake-airflow-rate control part 110, a wastegate-valve control part 111, and a torque-value control part 112 are stored as software.

The intake-airflow-rate control part 110 includes a requested-torque computing section 120, a target-torque computing section 121, a target in-cylinder fresh-air amount computing section 122, a target intake-airflow-rate computing section 123, and a throttle-valve opening-degree control section 124.

The wastegate-valve control part 111 includes a target inlet-manifold pressure computing section 130, a target throttle-valve upstream pressure computing section 131, a target compressor driving-force computing section 132, an exhaust-gas flow-rate computing section 133, an actual compressor driving-force computing section 134, and a wastegate-valve opening-degree computing section 135.

The torque-value control part 112 includes an actual intake-airflow-rate computing section 140, an actual in-cylinder fresh-air amount computing section 141, and an estimated-torque computing section 142.

The requested-torque computing section 120 calculates a driver-requesting output torque TRQd requested by a driver of the vehicle based on, for example, the rotation speed Ne of the engine 1 (or a running speed VS of the vehicle) and the accelerator opening degree D.

The target-torque computing section 121 calculates the target output torque TRQt to be generated by the engine 1 or a target indicated mean effective pressure Pit based on the driver-requesting output torque TRQd.

The target in-cylinder fresh-air amount computing section 122 calculates a target charging efficiency Ect or a target in-cylinder fresh-air amount Qct based on any one of the target output torque TRQt and the target indicated mean effective pressure Pit, the air/fuel ratio AF, and a thermal efficiency q.

The target intake-airflow-rate computing section 123 calculates a target intake airflow rate Qat of air to be sucked into the engine 1 based on the target in-cylinder fresh-air amount Qct.

The throttle-valve opening-degree control section 124 controls the throttle-valve opening degree TH of the throttle valve 4 to change an opening area of the intake pipe 2 so as to variably control an actual intake airflow rate Qar.

The intake-airflow-rate control part 110 controls the throttle-valve opening degree TH through the throttle-valve opening-degree control section 124 so that the actual intake airflow rate Qar becomes equal to the target intake airflow rate Qat.

The target inlet-manifold pressure computing section 130 calculates a target inlet-manifold pressure Pbt based on the target charging efficiency Ect and a volumetric-efficiency correction factor Kv.

The target throttle-valve upstream pressure computing section 131 detects the rotation speed Ne of the engine 1 and calculates a target throttle-valve upstream pressure P2t based on the target charging efficiency Ect and the target inlet-manifold pressure Pdt.

The target compressor driving-force computing section 132 calculates a target compressor driving force Pct based on the target throttle-valve upstream pressure P2t and the target intake airflow rate Qat.

The exhaust-gas flow-rate computing section 133 calculates an exhaust-gas flow rate Qex based on an actual in-cylinder fresh-air amount Qcr and the air/fuel ratio AF.

The actual compressor driving-force computing section 134 calculates an actual compressor driving force Pcr based on the throttle-valve upstream pressure P2 and the actual intake airflow rate Qar.

The wastegate-valve opening-degree computing section 135 calculates a wastegate-valve opening degree WG corresponding to a wastegate-valve control amount based on the actual compressor driving force Pcr, the exhaust-gas flow rate Qex, and the target compressor driving force Pct.

The wastegate-valve control part 111 drives the wastegate valve 34 by using the wastegate-valve opening degree WG as a duty ratio of the wastegate valve 34 so that the actual compressor driving force Pcr becomes equal to the target compressor driving force Pct.

The actual intake-airflow-rate computing section 140 calculates the actual intake airflow rate Qar of air to be sucked into the engine 1 based on the actually-measured airflow rate Qr from the airflow sensor 12 or the inlet-manifold pressure Pb from the inlet-manifold pressure sensor 15.

The actual in-cylinder fresh-air amount computing section 141 calculates the actual in-cylinder fresh-air amount Qcr of air to be sucked into the cylinder 8 based on the actually-measured airflow rate Qr from the airflow sensor 12 or the inlet-manifold pressure Pb from the inlet-manifold pressure sensor 15.

The estimated-torque computing section 142 calculates a charging efficiency Ecr based on the actual in-cylinder fresh-air amount Qcr, the air/fuel ratio Af, and the thermal efficiency q and performs a computation for estimating the actual torque generated from the engine 1, specifically, calculates the estimated output torque TRQ of the engine 1 or the estimated indicated mean effective pressure Pir.

The torque-value control part 112 calculates the actual intake airflow rate Qar of air to be sucked into the engine 1, and any one of the charging efficiency Ecr of air to be sucked into the cylinder 8 and the actual in-cylinder fresh-air amount Qcr. The torque-value control part 112 also calculates the thermal efficiency q of the engine 1 from the charging efficiency Ecr.

Figure 4:
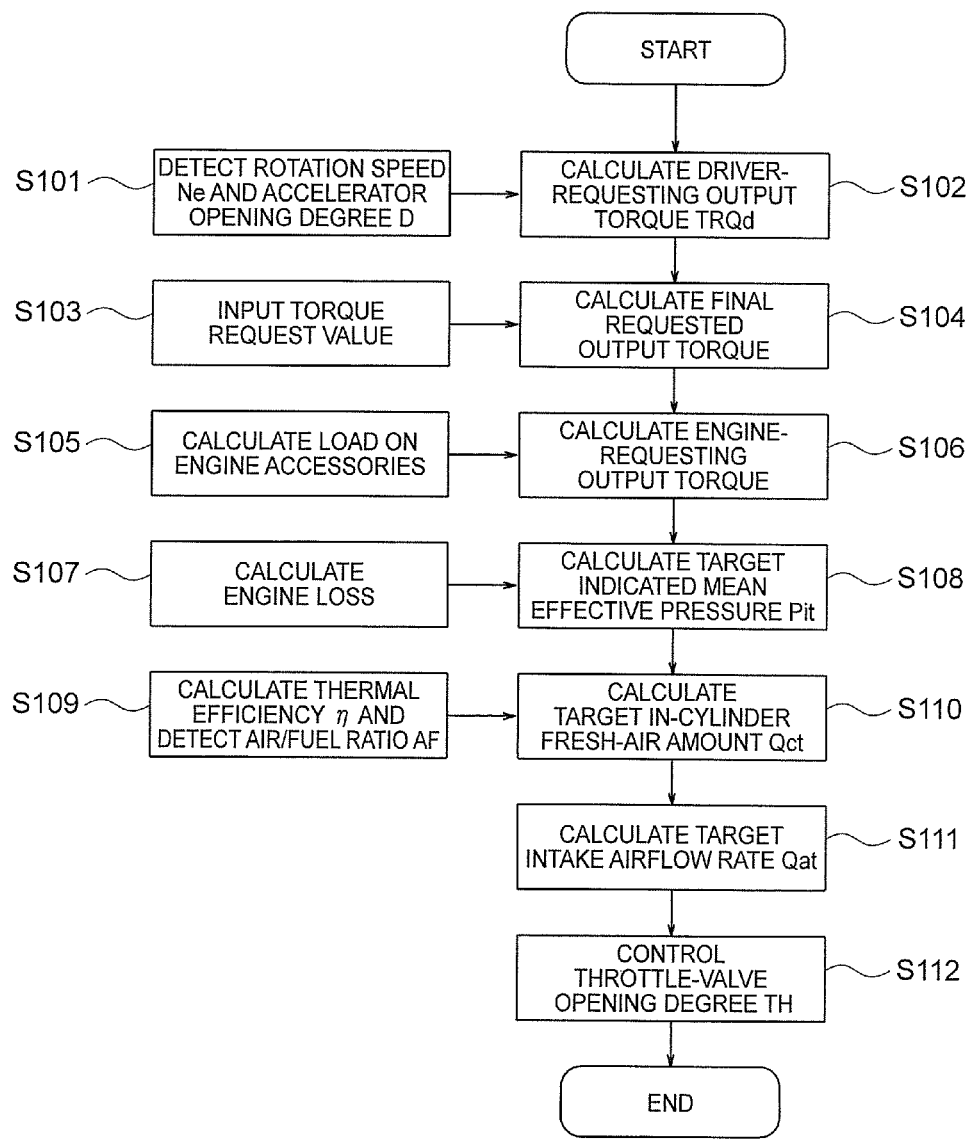
FIG. 4 is a flowchart illustrating a calculation process by an intake-airflow-rate control part according to the present invention.

Next, referring to a flowchart of FIG. 4 illustrating intake-airflow-rate control together with FIGS. 1 to 3, a calculation process by the intake-airflow-rate control part 110 according to the first embodiment of the present invention is described.

First, the crank-angle sensor 11 detects the rotation speed Ne of the engine 1, whereas the accelerator opening-degree sensor (included in the various sensors S illustrated in FIG. 2) detects the accelerator opening degree D (Step S101). The detected value described above should be used as the rotation speed Ne of the engine 1.

At this time, in place of the detection of the rotation speed Ne of the engine 1 by the crank-angle sensor 11, the vehicle-speed sensor (included in the various sensors S illustrated in FIG. 2) may detect the running speed VS of the vehicle.

Subsequently, the requested-torque computing section 120 calculates the driver-requesting output torque TRQd requested by the driver of the vehicle, as expressed by Expression (1) described below, by using a driver-requesting output torque map (stored in the storage section) set as a map based on the relationship between the rotation speed Ne of the engine 1 (or the running speed VS) and the accelerator opening degree D (Step S102). In Expression (1), MAP1 is set by using the above-mentioned driver-requesting output torque map value which is computed previously.

$$TRQd = MAP1[Ne, D] \qquad \text{Expression (1)}$$

Next, torque request values are input respectively from the other controllers C (for example, the controllers for transmission control, brake control, and traction control) (Step S103).

Subsequently, the intake-airflow-rate control part 110 (target-torque computing section 121) selects any one of the driver-requesting output torque TRQd and the torque request value in accordance with operating states and calculates the selected value as a final requested output torque (Step S104). The final requested output torque calculated in Step S104 indicates a torque output from a crankshaft of the engine 1.

Next, the intake-airflow-rate control part 110 (target-torque computing section 121) calculates a load on an alternator, an air-conditioner compressor, a power-steering pump, a transmission pump, and a torque converter, which are generally called "engine accessories". The intake-airflow-rate control part 110 calculates the load by using, for example, a map value (stored in the storage section) which is computed previously for each rotation speed Ne, based on actual data obtained by measurements in the engine accessories (Step S105).

Subsequently, the intake-airflow-rate control part 110 (target-torque computing section 121) adds the final requested output torque and the engine-accessory load to calculate an engine-requesting output torque in view of the load on the engine accessories associated with the engine 1 (Step S106).

Next, the target-torque computing section 121 calculates a mechanical loss and a pumping loss of the engine 1 itself (collectively referred to as "engine loss") by using, for example, a map value (stored in the storage section) which is computed previously for each rotation speed Ne, based on actual data obtained by measurements in the engine 1 (Step S107).

Subsequently, the target-torque computing section 121 adds the engine-requesting output torque and the engine loss to calculate the target indicated mean effective pressure Pit to be generated in the cylinder 8 of the engine 1 (Step S108). Alternatively, the target-torque computing section 121 may calculate the target output torque TRQt in place of the target indicated mean effective pressure Pit.

Next, the torque-value control part 112 calculates the thermal efficiency q of the engine 1 by using, for example, a map value (stored in the storage section) computed previously for each rotation speed Ne, based on the actual data obtained by measurements in the engine 1. The air/fuel-ratio sensor 16 detects the air/fuel ratio AF of the combustible mixture gas (Step S109).

Subsequently, the target in-cylinder fresh-air amount computing section 122 calculates the target in-cylinder fresh-air amount Qct for realizing the target indicated mean effective pressure Pit based on the target indicated mean effective pressure Pit, the thermal efficiency q, and the air/fuel ratio AF as expressed by Expression (2) described below (Step S110). In Expression (2), Vc [L] indicates a cylinder-stroke volume per cylinder.

$$Qct = AF \times Pit \times Vc/(\eta \times 44000) \qquad \text{Expression (2)}$$

Next, the target intake-airflow-rate computing section 123 calculates the target intake airflow rate Qat [g/s] of air to be sucked into the engine 1 based on the target in-cylinder fresh-air amount Qct and the volumetric-efficiency correction factor Kv, as expressed by Expression (3) described below (Step S111). In Expression (3), filter1 is a function for processing with a first-order lead filter having KCCA as a filter coefficient.

$$Qat = filter1[Qct, Qct(n-1) \times Kv, KCCA] \qquad \text{Expression (3)}$$

Subsequently, considering a flow in the vicinity of the throttle valve 4 as a flow before and after the throttle valve, the intake-airflow-rate control part 110 (throttle-valve opening-degree control section 124) uses the theoretical formula of hydrodynamics, which corresponds to a formula for calculating a flow rate through an orifice, to calculate the intake airflow rate (volumetric flow rate Q).

In general, the volumetric flow rate Q is calculated by the law of energy conservation, the relational expression of an isoentropic flow, the relational expression of a sound velocity, and the state equation, as expressed by Expressions (4) described below.

In Expressions (4), κ is a ratio of specific heat, R is a gas constant, P is a pressure, ρ is a density, T is a temperature, a is a sound velocity, u is a flow velocity, m is a mass flow rate, and Sth is an effective opening area.

For the subscripts, 0 indicates an atmosphere, b indicates the intake manifold, and e indicates the throttle valve.

$$\frac{1}{2}u_e^2 + \frac{\kappa}{\kappa-1}\frac{P_e}{\rho_e} = \frac{\kappa}{\kappa-1}\frac{P_0}{\rho_0},$$

$$\frac{P}{\rho^\kappa} = \text{constant},$$

$$a = \sqrt{\kappa RT},$$

$$p = \rho RT$$

$$\therefore Q = a_0 \cdot S_{th} \cdot \sigma \left( \because \sigma = \sqrt{\frac{2}{\kappa-1}\left[\left(\frac{P_e}{P_0}\right)^{\frac{2}{\kappa}} - \left(\frac{P_e}{P_0}\right)^{\frac{\kappa+1}{\kappa}}\right]} \right) \qquad \text{Expression (4)}$$

A target value of the throttle-valve opening degree TH is calculated based on a flow-rate correction factor MAP (stored in the storage section), a sound-velocity MAP (stored in the storage section), and an effective opening-area MAP (stored in the storage section), which are based on Expressions (4) described above, as expressed by Expression (5) described below. The flow-rate correction factor MAP indicates characteristics determined by a ratio Pb/P2 corresponding to a ratio of the throttle-valve upstream pressure P2 and the inlet-manifold pressure Pb corresponding to a throttle-valve downstream pressure, that is, a ratio of the throttle-valve upstream pressure and the throttle-valve downstream pressure. The sound-velocity MAP indicates characteristics of the intake-air temperature and the sound velocity. The effective opening-area MAP is computed previously based on characteristic data of the effective opening area and the throttle-valve opening degree which are measured in the engine 1. Then, the throttle-valve opening degree TH is controlled through the throttle-valve opening-degree control section 124 (Step S112).

$$TH = \text{effective opening area MAP } [Qat/(\text{flow-rate correction factor MAP } [Pb/P2] \times \text{sound-velocity MAP}[AT])] \qquad \text{Expression (5)}$$

By calculating a learning value of the effective opening area MAP, which is to be corrected, using throttle-valve opening-degree feedback so that the calculated actual intake airflow Qar from the airflow sensor 12 or the inlet-manifold pressure sensor 15 becomes equal to the target intake airflow rate Qat, the target intake airflow rate Qat can be achieved with high accuracy.

By controlling the intake airflow rate in the manner described above, the driver-requesting output torque TRQd and the torque request values from the other controllers can be achieved with high accuracy.

Figure 5:
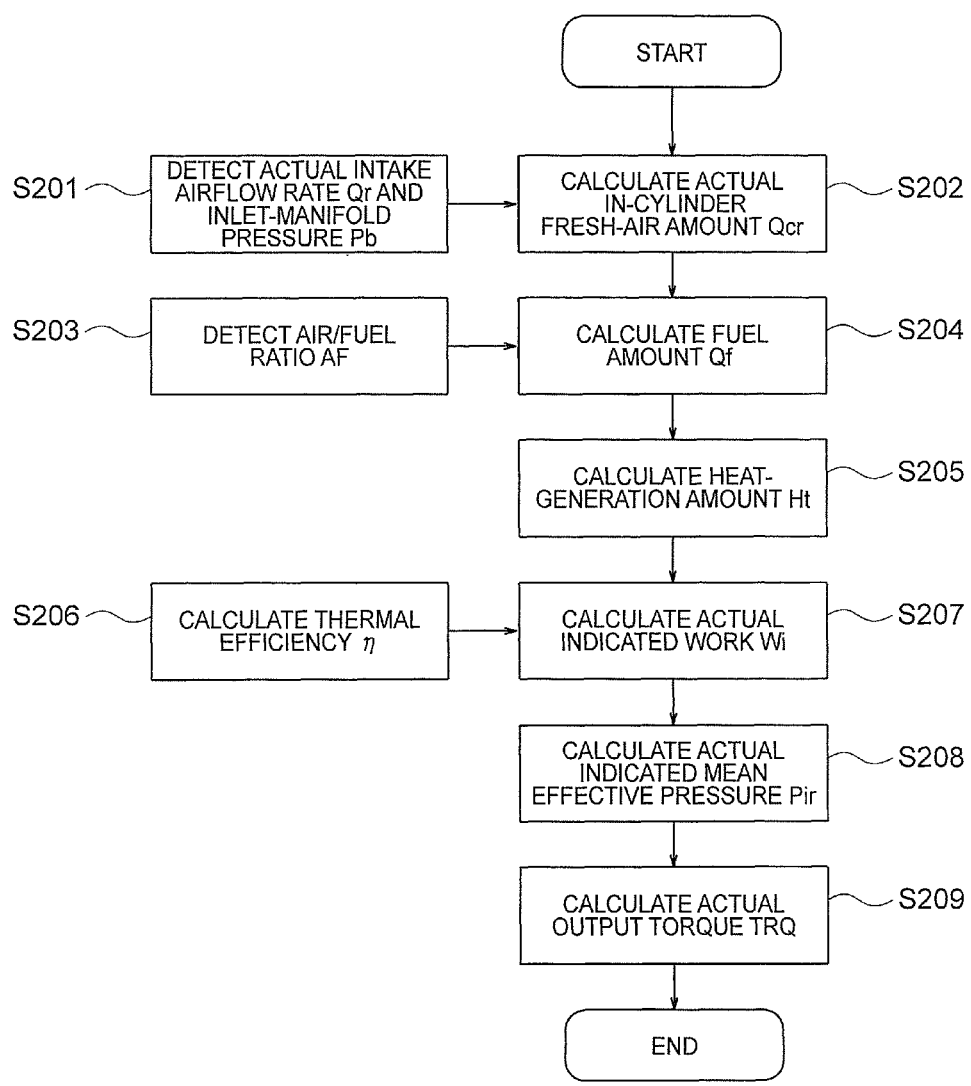
FIG. 5 is a flowchart illustrating a process for calculating an estimated torque according to the present invention.

Hereinafter, referring to a flowchart of FIG. 5 illustrating a process for calculating the estimated torque (torque-value control) together with FIGS. 1 to 3, the process for calculating the estimated output torque TRQ according to the first embodiment of the present invention is more specifically described.

First, the airflow sensor 12 detects the actual intake airflow rate Qr of the air sucked into the engine 1, or the inlet-manifold pressure sensor 15 detects the inlet-manifold pressure Pb in the surge tank 5 (Step S201).

Subsequently, the torque-value control part 112 calculates the actual intake airflow rate Qar based on the actual (measured) intake airflow rate Qr in the actual intake-airflow-rate computing section 140, as expressed by Expression (6) described below and executes a first-order lag filter process on the actual intake airflow rate Qar, as expressed by Expression (7) described below. Alternatively, the torque-value control part 112 calculates the actual in-cylinder fresh-air amount Qcr [g] for each stroke by estimating a density in the cylinder 8 from the inlet-manifold pressure Pb from the inlet-manifold pressure sensor 15 and the volumetric-efficiency correction factor Kv in the actual in-cylinder fresh-air amount computing section 141 and applying the state equation described above in Expressions (4), as expressed by Expressions (8) and (9) described below (Step S202). In Expression (7), filter2 is a function for the process with the first-order lag filter having KCCA as a filter coefficient. In Expressions, Vc [L] indicates a cylinder-stroke volume per cylinder.

In Expressions (7) to (9), R is a gas constant, P is a pressure, ρ is a density, T is a temperature, Kv is a volumetric-efficiency correction factor, Vc is a cylinder-stroke volume per cylinder, AT is an intake-air temperature, and Pb is an inlet-manifold pressure.

$$Qar = Qr \text{ (value measured by the airflow sensor)} \qquad \text{Expression (6)}$$

$$Qcr = filter2[Qar, Qcr(n-1), KCCA] \qquad \text{Expression (7)}$$

$$\rho = Qcr/(Kv \times Vc), P = \rho RT \text{ (state equation)} \qquad \text{Expression (8)}$$

$$Pb = \rho \times R \times AT = Qcr/(Kv \times Vc) \times R \times AT,$$

$$Qcr = Pb \times (Kv \times Vc)/(R \times AT) \qquad \text{Expression (9)}$$

Next, the air/fuel-ratio sensor 16 detects the air/fuel ratio AF of the combustible mixture gas (Step S203). The air/fuel ratio AF may be a detection value actually detected by the air/fuel-ratio sensor 16 or may be obtained from a target value of the air/fuel ratio AF, which is used to calculate driving time of the injector 17.

Subsequently, the estimated-torque computing section 142 calculates a fuel amount Qf [g] for each stroke based on the actual in-cylinder fresh-air amount Qcr for each stroke and the air/fuel ratio AF, as expressed by the following Expression (10) (Step S204).

$$Qf=Qcr/AF \qquad \text{Expression (10)}$$

The estimated-torque computing section 142 calculates a heat-generation amount Ht [J] from the fuel amount Qf for each stroke based on a heat-generation amount of the fuel used for the engine 1 (in the case of gasoline, about 44 [MJ/kg], for example) as expressed by the following Expression (11) (Step S205).

$$Ht=Qf\times 44000 \qquad \text{Expression (11)}$$

Next, the torque-value control part 112 (estimated-torque computing section 142) calculates the thermal efficiency q [%] of the engine 1 (Step S206).

Subsequently, the estimated-torque computing section 142 calculates actual indicated work Wi [J] corresponding to work of a combustion gas on the piston in the cylinder 8, based on the heat-generation amount Ht and the thermal efficiency q, as expressed by the following Expression (12) (Step S207).

$$Wi=Ht\times\eta \qquad \text{Expression (12)}$$

Next, the estimated-torque computing section 142 calculates an estimated indicated mean effective pressure Pir [kPa] based on the actual indicated work Wi, as expressed by Expression (13) described below (Step S208). In Expression (13), Vc [L] indicates a cylinder-stroke volume per cylinder.

$$Pir=Wi/Vc \qquad \text{Expression (13)}$$

Expressions (10), (11), (12), and (13) are summarized as the following Expression (14).

$$\begin{aligned} Pir &= Wi/Vc & \text{Expression (14)} \\ &= Ht\times\eta/Vc \\ &= Qf\times 44000\times\eta/Vc \\ &= Qcr/AF\times 44000\times\eta/Vc \end{aligned}$$

By substituting the target in-cylinder fresh-air amount Qct for the actual in-cylinder fresh-air amount Qcr and the target indicated mean effective pressure Pit for the estimated indicated mean effective pressure Pir in Expression (14) described above, Expression (15) described below is obtained. It is understood that Expression (15) is equivalent to Expression (2) described above, which expresses the target in-cylinder fresh-air amount Qct.

$$Pit=Qcr/AF\times 44000\times\eta/Vc \qquad \text{Expression (15)}$$

Subsequently, the estimated-torque computing section 142 calculates the estimated output torque TRQ [Nm] based on the estimated indicated mean effective pressure Pir, as expressed by Expression (16) described below (Step S209). In Expression (16), z is the number of cylinders, and i is a rotation speed for one cycle (i=2 in the case of a four-cycle engine, for example).

$$TRQ=Pir\times Vc\times z/(2\pi\times i) \qquad \text{Expression (16)}$$

As described above, the estimated output torque TRQ can be calculated with high accuracy by using the actual in-cylinder fresh-air amount Qcr.

Figure 6:
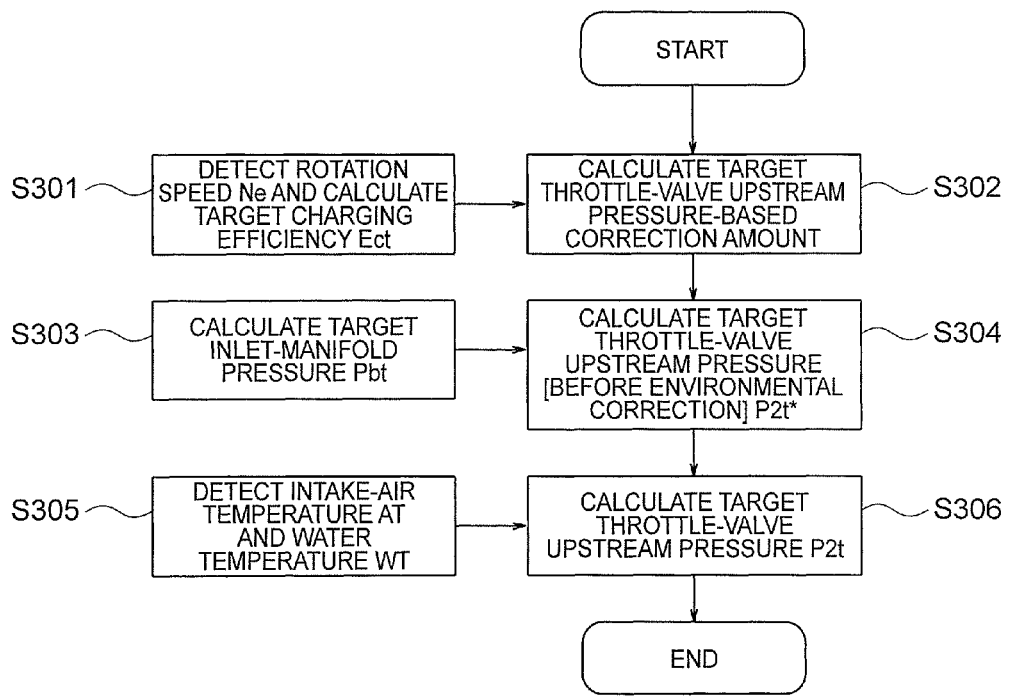
FIG. 6 is a flowchart illustrating a process for calculating a target throttle-valve upstream pressure according to the present invention.

Hereinafter, referring to a flowchart of FIG. 6 illustrating a process for calculating the target throttle-valve upstream pressure together with FIGS. 1 to 3, a process for calculating the target throttle-valve upstream pressure P2t according to the first embodiment of the present invention is more specifically described.

First, the crank-angle sensor 11 detects the rotation speed Ne of the engine 1. The target in-cylinder fresh-air computing section 122 calculates the target charging efficiency Ect based on the target indicated mean effective pressure Pit, the thermal efficiency η, and the air/fuel ratio AF, as expressed by Expression (17) described below (Step S301). In Expression (17), ρ0 [g/L] is an air density in a standard state, and Vc [L] is a cylinder-stroke volume per cylinder.

$$Ect=AF\times Pit/(\eta\times 44000\times\rho 0) \qquad \text{Expression (17)}$$

The target throttle-valve upstream pressure computing section 131 computes a correction amount based on the target throttle-valve upstream pressure (hereinafter, referred to as "target throttle-valve upstream pressure-based correction amount") from a previously computed map value (stored in the storage section) based on the rotation speed Ne and the target charging efficiency Ect (Step S302).

Next, the target inlet-manifold pressure computing section 130 calculates the target inlet-manifold pressure Pbt in consideration of the intake-air temperature At as an environmental correction, based on the target charging efficiency Ect and the volumetric-efficiency correction factor Kv, as expressed by the following Expression (18) (Step S303).

$$Pbt=P_{10}\{(Ect/Kv)\times(AT/T_{10})\} \qquad \text{Expression (18)}$$

In Expression (18), the subscript 10 indicates a standard state; $P_{10}=1$ atm, and $T_{10}=25°$ C.

Subsequently, the target throttle-valve upstream pressure computing section 131 adds the target throttle-valve upstream pressure-based correction amount and the target inlet-manifold pressure Pbt to calculate a target throttle-valve upstream pressure [before the environmental correction] P2t* (Step S304).

Next, the intake-air temperature AT is detected by the intake-air temperature sensor 13, whereas the water temperature WT is detected by the water-temperature sensor (included in the various sensors S illustrated in FIG. 2) (Step S305).

Subsequently, the target throttle-valve upstream pressure computing section 131 calculates the target throttle-valve upstream pressure P2t as an environmental-correction computation based on the target throttle-valve upstream pressure [before the environmental correction] P2t*, a correction value set in a map (stored in the storage section) based on the intake-air temperature AT, and a correction value set in a map (store in the storage section) based on the water temperature WT, as expressed by Expression (19) described below (Step S306). In Expression (19), MAP2 and MAP3 are respectively set with previously computed map values (stored in the storage section).

$$P2t=P2t*\times MAP2[AT]+MAP3[WT] \qquad \text{Expression (19)}$$

As described above, the target throttle-valve upstream pressure P2t can be calculated with high accuracy by using the target charging efficiency Ect.

Figure 7:
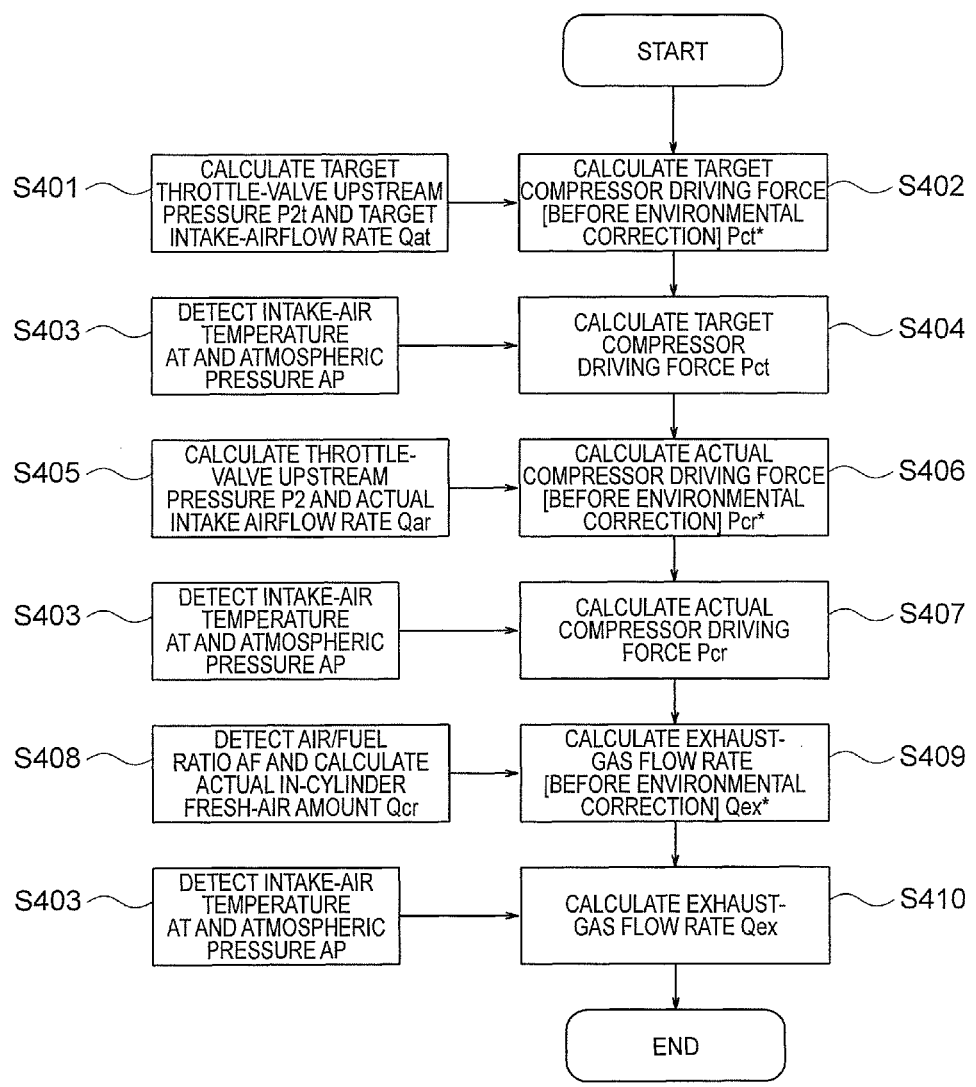
FIG. 7 is a flowchart illustrating a process for calculating a target compressor driving force, an actual compressor driving force, and an exhaust-gas flow rate according to the present invention.

Hereinafter, referring to a flowchart of FIG. 7 illustrating a process for calculating the target compressor driving force, the actual compressor driving force, and the exhaust-gas flow rate together with FIGS. 1 to 3, a process for calculating the target compressor driving force Pct, the actual compressor driving force Pcr, and the exhaust-gas flow rate Qex according to the first embodiment of the present invention is more specifically described.

First, a flow performed in the compressor 31 and the turbine 32 is described below. Here, in view of the law of conservation of mass, which corresponds to the law of physics relating to an air state, a polytropic change, and an adiabatic efficiency, an output Pt [W] of the turbine 32 and the compressor driving force Pc [W] are calculated by Expression (20) described below.

In Expression (20), Cp is a specific heat [kJ/(kg·K)] at constant pressure, Wt is a turbine output [J] per unit flow rate, We is a work load [J] of the compressor, κ is a ratio of specific heat, Qt is a mass flow rate [g/s] of the turbine, Qcmp is a mass flow rate [g/s] of the compressor (flow rate passing through the compressor; hereinafter, also referred to as "compressor-passage flow rate"), R is a gas constant [kJ/(kg·K)], qt is an adiabatic efficiency of the turbine, and ηc is an adiabatic efficiency of the compressor.

The subscripts 1 to 4 added to P and T (P is a pressure [kPa] and T is an absolute temperature [K]) indicate the following. The subscript 1 indicates an air inlet (atmosphere), 2 indicates a cylinder inlet (intake air), 3 indicates a cylinder outlet, and 4 indicates an exhaust port.

$$P_t = Q_t \cdot w_t \cdot \eta_t$$
$$= Q_t \cdot c_p T_3 \cdot \eta_t \left(1 - \left(\frac{P_4}{P_3}\right)^{\frac{\kappa-1}{\kappa}}\right)$$
$$= Q_t \cdot \eta_t \cdot \frac{\kappa}{\kappa-1} RT_3 \left(1 - \left(\frac{P_4}{P_3}\right)^{\frac{\kappa-1}{\kappa}}\right)$$

$$P_c = \frac{Q_{cmp} \cdot w_c}{\eta_c}$$
$$= Q_{cmp} \cdot \frac{c_p T_1}{\eta_c} \left(\left(\frac{P_2}{P_1}\right)^{\frac{\kappa-1}{\kappa}} - 1\right)$$
$$= Q_{cmp} \cdot \frac{1}{\eta_c} \cdot \frac{\kappa}{\kappa-1} RT_1 \left(\left(\frac{P_2}{P_1}\right)^{\frac{\kappa-1}{\kappa}} - 1\right)$$
$$\left(\because c_p = \frac{\kappa}{\kappa-1} R\right)$$

Expression (20)

Further, regarding characteristics of the turbine 32 and the compressor 31, the flow rate and the rpm of the turbine 32 tend to increase with an increase in a pressure ratio. Therefore, it can be said that an exhaust pressure P3 is a function of the exhaust-gas flow rate Qex.

Moreover, it is supposed that the exhaust-gas flow rate Qex and the turbine output Pt have an approximately proportional relationship in the range of general use of an automobile turbocharger. Therefore, it can be said that the turbine output Pt is a function of the exhaust-gas flow rate Qex.

From the above-mentioned facts, it can be said that the compressor driving force Pc is also a function of the exhaust-gas flow rate Qex as expressed by the following Expression (21).

$$Pc = Pt \cdot \eta m \propto Qex \qquad \text{Expression (21)}$$

In a steady state, the compressor-passage flow rate Qcmp becomes equal to the intake airflow rate Qa. Thus, the compressor driving force Pc can be obtained by Expression (22) described blow using the intake airflow rate Qa and the throttle-valve upstream pressure P2.

$$P_c = Q_a \cdot \frac{\kappa}{\kappa-1} RT_1 \left(\left(\frac{P_2}{P_1}\right)^{\frac{\kappa-1}{\kappa}} - 1\right) \qquad \text{Expression (22)}$$

Next, the target throttle-valve upstream pressure computing section 131 calculates the target throttle-valve upstream pressure P2t based on the rotation speed Ne, the volumetric-efficiency correction factor Kv, and the target charging efficiency Ect in accordance with Steps S301 to S306 (Expressions (17) to (19)) described above. The target intake-airflow-rate computing section 123 calculates the target intake airflow rate Qat of the air to be sucked into the engine 1 based on the target in-cylinder fresh-air amount Qct and the rotation speed Ne in accordance with Step S111 (Expression (3)) (Step S401).

Subsequently, considering that the ratio (P2/P1) in Expression (10) described above is a ratio (P2t/AP) of the target throttle-valve upstream pressure P2t and the atmospheric pressure AP, the target compressor driving-force computing section 132 expresses the ratio as a function f1 of (P2t/AP) to calculate a target compressor driving force [before the environmental correction] Pct* based on the target throttle-valve upstream pressure P2t and the target intake airflow-rate Qat as expressed by Expression (23) (Step S402). The function f1 is set by a previously computed map value.

$$Pct^* = Q_{at} \cdot \frac{\kappa}{\kappa-1} RT_1 \left(\left(\frac{P_2}{P_1}\right)^{\frac{\kappa-1}{\kappa}} - 1\right) \qquad \text{Expression (23)}$$
$$= Qat \times f1[P2t/AP]$$

Next, the intake-air temperature At is detected by the intake-air temperature sensor 13, whereas the atmospheric pressure AP is detected by the atmospheric-pressure sensor 9 (Step S403).

Subsequently, the target compressor driving-force computing section 132 calculates the target compressor driving force Pct as an environmental-correction computation, based on the target compressor driving force [before the environmental correction] Pct*, a correction value based on the intake-air temperature AT, and a correction value based on the atmospheric pressure AP (Step S404).

$$Pct = Pct^* \cdot (P_{10}/AP) \cdot \sqrt{(T_{10}/AT)} \qquad \text{Expression (24)}$$

In Expression (24), the subscript 10 indicates a standard state; $P_{10}$=1 atm, and $T_{10}$=25° C.

Further, the throttle-valve upstream pressure P2 is detected by the throttle-valve upstream pressure sensor 35. The actual intake-airflow-rate computing section 140 calculates the actual intake airflow rate Qar of the air to be sucked into the engine 1 based on the actually-measured airflow rate Qr from the airflow sensor 12 or the inlet-manifold pressure Pb from the inlet-manifold sensor 15 in the same manner as in Step S202 described above (Expression (6)) (Step S405).

Subsequently, considering that the ratio (P2/P1) in Expression (10) described above is a ratio (P2/AP) of the throttle-valve upstream pressure P2 and the atmospheric pressure AP as in Step S402, the actual compressor driving-force computing section 134 expresses the ratio (P2/AP) as a function f1 of (P2/AP) to calculate the actual compressor driving force [before the environmental correction] Pcr* based on the throttle-valve upstream pressure P2 and the actual intake airflow rate Qar in the same manner as in Step S402, as expressed by Expression (25) described below (Step S406). The function f1 is set by a previously computed map value.

$$Pcr^* = Q_{ar} \cdot \frac{\kappa}{\kappa-1} RT_1 \left[ \left(\frac{P_2}{P_1}\right)^{\frac{\kappa-1}{\kappa}} - 1 \right] \quad \text{Expression (25)}$$

$$= Qar \times f1[P2/AP]$$

Subsequently, the actual compressor driving-force computing section 134 calculates the actual compressor driving force Pcr as an environmental-correction computation, based on the actual compressor driving force [before the environmental correction] Pcr*, and the correction value based on the intake-air temperature AT and the correction value based on the atmospheric pressure AP, which are obtained in Step S403, as expressed by the following Expression (26) (Step S407).

$$Pct = Pct^* \cdot (P_{10}/AP) \cdot \sqrt{(T_{10}/AT)} \quad \text{Expression (26)}$$

In Expression (26), the subscript 10 indicates a standard state; $P_{10}$=1 atm, and $T_{10}$=25° C.

Further, the air/fuel-ratio sensor 16 detects the air/fuel ratio AF of the combustible mixture gas. The actual in-cylinder fresh-air amount computing section 141 calculates the actual in-cylinder fresh-air amount Qcr of the air to be sucked into the cylinder 8 based on the actually-measured airflow rate Qr from the airflow sensor 12 or the inlet-manifold pressure Pb from the inlet-manifold pressure sensor 15 in the same manner as in Step S202 described above (Expressions (6) to (9)) (Step S408).

Subsequently, the exhaust-gas flow-rate computing section 133 calculates the exhaust-gas flow rate [before the environmental correction] Qex* based on the actual in-cylinder fresh-air amount Qcr and the air/fuel ratio AF, as expressed by the following Expression (27) (Step S409).

$$Qex^* = Qcr \cdot \{1 + (1/(AF))\} \quad \text{Expression (27)}$$

Subsequently, the exhaust-gas flow-rate computing section 133 calculates the exhaust-gas flow rate Qex as an environmental-correction computation based on the exhaust-gas flow rate [before the environmental correction] Qex*, and the correction value obtained based on the intake-air temperature AT and the correction value obtained based on the atmospheric pressure AP, which are obtained in Step S403, as expressed by the following Expression (28) (Step S410).

$$Qex = Qex^* \cdot (P_{10}/AP) \cdot \sqrt{(AT/T_{10})} \quad \text{Expression (28)}$$

In Expression (28), the subscript 10 indicates a standard state; $P_{10}$=1 atm, and $T_{10}$=25° C.

As described above, the target compressor driving force Pct, the actual compressor driving force Pcr, and the exhaust-gas flow rate Qex can be calculated with high accuracy by taking the environmental correction into consideration.

Figure 8:
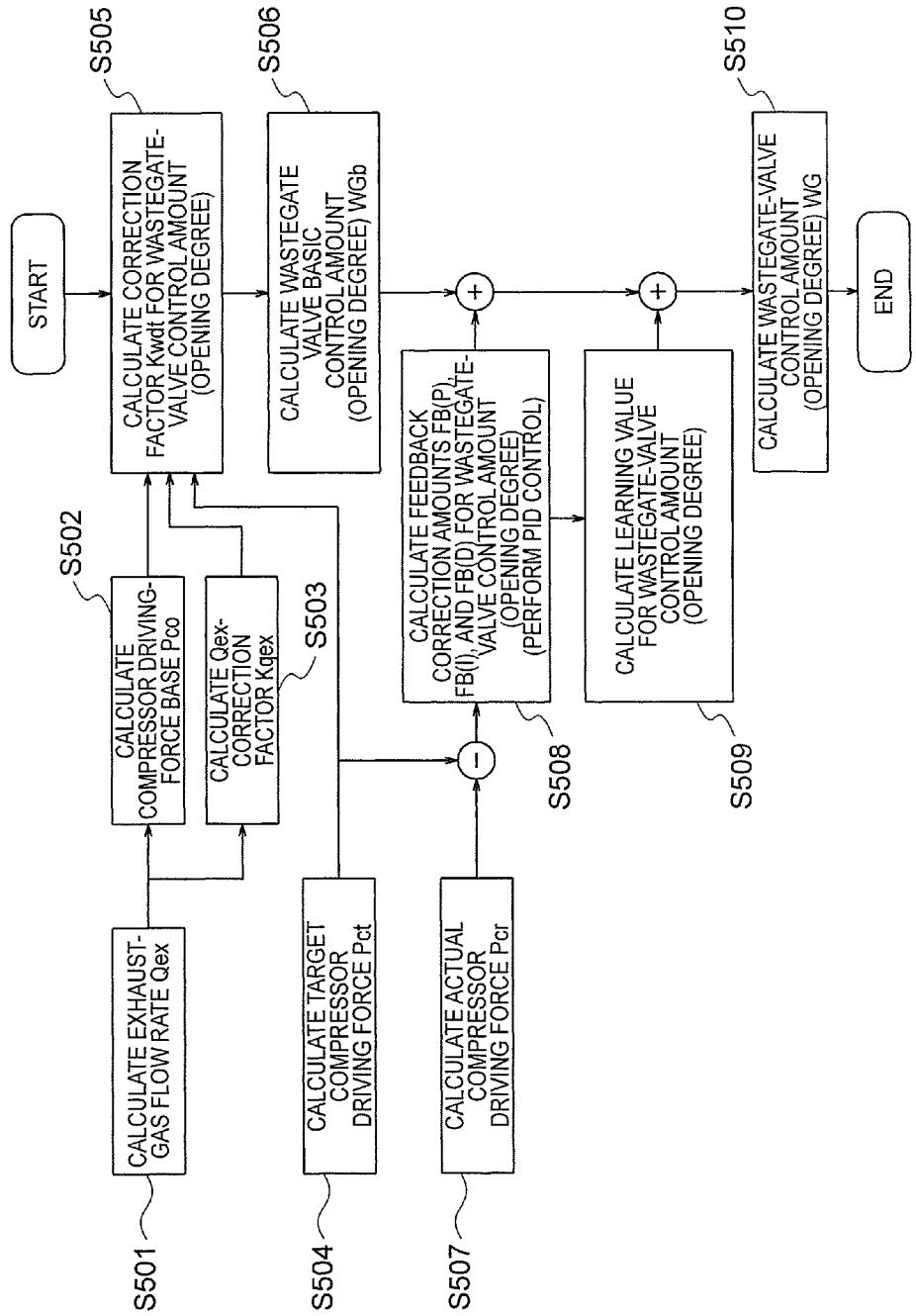
FIG. 8 is a flowchart illustrating a process for controlling a wastegate valve according to the present invention.

Hereinafter, referring to a flowchart of FIG. 8 illustrating a process for controlling the wastegate valve together with FIGS. 1 to 3, a process for calculating the wastegate-valve control amount (opening degree) WG according to the first embodiment of the present invention is more specifically described.

Figure 9:
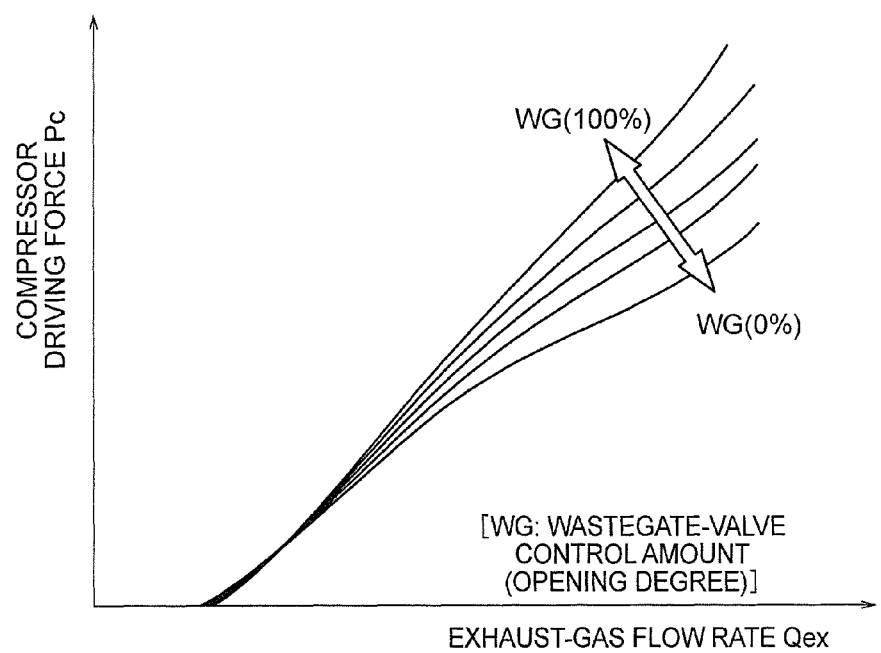
FIG. 9 is a graph showing the relationship between a compressor driving force and the exhaust-gas flow rate with respect to a wastegate-valve control value (opening degree) according to the present invention.

First, the relationship characteristics between the exhaust-gas flow rate Qex and the compressor driving force Pc can be expressed in a multi-term approximation equation form as shown in FIG. 9. The multi-term approximation equation has the relationship depending only on the wastegate-valve control value (opening degree) WG without being affected by the rotation speed Ne or the inlet-manifold pressure Pb. Therefore, the wastegate-valve control value (opening degree) WG can be calculated based on the exhaust-gas flow rate Qex and the target compressor driving force Pct.

Next, the exhaust-gas flow-rate computing section 133 calculates the exhaust-gas flow rate Qex based on the actual in-cylinder fresh-air amount Qcr and the air/fuel ratio AF in the same manner as in Steps S409 and S410 described above (Expressions (27) and (28)) (Step S501).

Subsequently, it is known that the relationship of the above-mentioned multi-term approximation equation shown in FIG. 9 is set by replacing the characteristics of the exhaust-gas flow rate Qex and a compressor driving-force base Pco by a linear function f2 having a previously computed map value (stored in the storage section) and replacing the characteristics of the exhaust-gas flow rate Qex and a Qex-correction factor Kqex by a linear function f3 having a previously computed map value (stored in the storage section). Therefore, the compressor driving-force base Pco and the Qex-correction factor Kqex and calculated by the linear functions f2 and f3 based on the exhaust-gas flow rate Qex, as expressed by the following Expressions (29) and (30) (Steps S502 and S503).

$$Pco = f2[Qex] \quad \text{Expression (29)}$$

$$Kqex = f3[Qex] \quad \text{Expression (30)}$$

Next, the target compressor driving-force computing section 132 calculates the target compressor driving force Pct based on the target throttle-valve upstream pressure P2t and the target intake airflow rate Qat in the same manner as in Steps S402 to S404 described above (Expressions (23) and (24)) (Step S504).

Further, the wastegate-valve opening-degree computing section 135 calculates a correction factor Kwdt for the wastegate-valve control amount (opening degree) based on the compressor driving-force base Pco, the Qex-correction factor Kqex, and the target compressor driving force Pct, as expressed by the following Expression (31) (Step S505).

$$Kwdt = \{(Pct/Pco) - 1\}/Kqex \quad \text{Expression (31)}$$

Next, the wastegate-valve opening-degree computing section 135 calculates a wastegate valve basic control amount (opening degree) WGb by a linear function f4 corresponding to a previously computed map (stored in the storage section) based on the correction factor Kwdt for the wastegate-valve control amount (opening degree), as expressed by the following Expression (32) (Step S506).

$$WGb = f4[Kwdt] \quad \text{Expression (32)}$$

Next, the actual compressor driving-force computing section 134 calculates the actual compressor driving force Pcr based on the throttle-valve upstream pressure P2 and the actual intake airflow rate Qar in the same manner as in Steps S406 and S407 described above (Expressions (25) and (26)) (Step S507).

Subsequently, the wastegate-valve opening-degree computing section 135 performs feedback control corresponding to PID control on the target compressor driving force Pct and the actual compressor driving force Pcr to calculate feedback correction amounts FB(P), FB(I), and FB(D) for the wastegate-valve control amount (opening degree) (Step S508).

Further, the wastegate-valve opening-degree computing section 135 calculates, for example, the amount of excess of the feedback correction amount FB(I) for the wastegate-valve control amount (opening degree) from a threshold value as a learning amount of the wastegate-valve control amount (opening degree) for eliminating the effects from variation factors such as an individual variability of the turbocharger and a change with time (Step S509).

Next, the wastegate-valve opening-degree computing section 135 calculates the wastegate-valve opening degree WG corresponding to the wastegate-valve control amount based on the wastegate valve basic control amount (opening degree) WGb, the feedback correction amounts FB(P), FB(I), and FB(D) for the wastegate-valve control amount (opening degree), and the learning amount of the wastegate-valve control amount (opening degree), as expressed by the following Expression (33) (Step S510).

$$WG=WGb+(FB(P)+FB(I)+FB(D))+\text{learning amount} \quad \text{Expression (33)}$$

By replacing the relationship of the multi-term approximation equation described above by the two corresponding functions (map values), which are based on the exhaust-gas flow rate Qex, and based on the target compressor driving force Pct, the wastegate-valve opening degree WG corresponding to the wastegate-valve control amount can be controlled with high accuracy.

Specifically, the wastegate-valve control part 111 performs control so that the actual compressor driving force Pcr becomes equal to the target compressor driving force Pct. In the case of the pressure-type waste gate valve, the wastegate-valve control part 111 drives the wastegate valve 34 by using the wastegate-valve opening degree WG as a duty ratio of the wastegate valve 34, for controlling the pressure to be applied to the diaphragm. In the case of the electric wastegate valve, the wastegate-valve control part 111 drives the wastegate valve 34 by using the wastegate valve opening degree WG.

As described above, the wastegate-valve opening-degree computing section 135 calculates the wastegate-valve opening degree WG corresponding to the wastegate-valve control amount with high accuracy based on the exhaust-gas flow rate Qex and the target compressor driving force Pct.

The target compressor driving force Pct is calculated by the target compressor driving-force computing section 132, whereas the exhaust-gas flow rate Qex is calculated by the exhaust-gas flow-rate computing section 133. Further, the intake air amount can be controlled with high accuracy by the intake-airflow-rate control part 110 and hence, this embodiment is realizable.

According to the control device for the internal combustion engine of the embodiment of the present invention, the intake-airflow-rate control part 110 calculates the target intake airflow rate Qat based on the target indicated mean effective pressure Pit (target output torque TRQt) calculated by the target-torque computing section 121, calculates the target value of the throttle-valve opening degree TH so as to achieve the target intake airflow rate Qat, and controls the throttle-valve opening degree TH through the throttle-valve opening-degree control section 124.

Therefore, the driver-requesting output torque TRQd and the torque request values from the other controllers can be achieved with high accuracy.

Further, the estimated-torque computing section 142 calculates the estimated output torque TRQ of the engine 1 or the estimated indicated mean effective pressure Pir based on the air/fuel ratio AF, any one of the inlet-manifold pressure Pb and the actual intake airflow rate Qar, and the thermal efficiency q.

Therefore, the estimated output torque TRQ of the engine 1 can be calculated with high accuracy while reducing a control map capacity.

Moreover, the wastegate-valve control part 111 calculates the target throttle-valve upstream pressure P2t based on the target inlet-manifold pressure Pbt calculated by the target inlet-manifold pressure computing section 130. Further, the target compressor driving force Pct, the actual compressor driving force Pcr, and the exhaust-gas flow rate Qex are calculated in consideration of the environmental correction, by the target compressor driving-force computing section 132, the actual compressor driving-force computing section 134, and the exhaust-gas flow-rate computing section 133, respectively. Then, the wastegate-valve opening-degree computing section 135 computes the wastegate-valve opening degree WG corresponding to the wastegate-valve control amount based on the actual compressor driving force Pcr, the exhaust-gas flow rate Qex, and the target compressor driving force Pct. Then, the wastegate-valve control part 111 drives the wastegate valve 34 by using the wastegate-valve opening degree WG as the duty ratio of the wastegate valve 34 so that the actual compressor driving force Pcr becomes equal to the target compressor driving force Pct.

Specifically, by controlling the intake airflow rate, the supercharging pressure of the supercharger (turbocharger) can be controlled with high accuracy through the wastegate-valve opening degree WG corresponding to the wastegate-valve control amount.

For the air/fuel ratio AF and each of the target control values (for example, the opening degree at the intake/exhaust WT, the EGR ratio, and the ignition timing), optimal values corresponding to the operating states such as the rotation speed Ne of the engine 1 and the charging efficiency Ec are previously stored as the control maps in the storage section. At the time when the target intake airflow rate Qat is achieved, optimal control values are calculated. By controlling the injector 17 and the ignition coil 19 by using the control values as the target values, the air/fuel ratio AF and the target control values are respectively controlled to the optimal values.

What is claimed is:

1. A control device for an internal combustion engine including: a throttle valve provided in an intake path of the internal combustion engine; a supercharger including a turbine provided in an exhaust path and a compressor provided in the intake path on an upstream side of the throttle valve, for rotating integrally with the turbine; a wastegate valve provided in a bypass passage for bypassing the turbine; and a wastegate-valve driving section for driving the wastegate valve to change a flow-path sectional area of the bypass passage, the control device comprising a wastegate-valve control part including:

a target throttle-valve upstream pressure computing section for calculating a target throttle-valve upstream pressure corresponding to a target value of a pressure on the upstream side of the throttle valve based on a target value of a charging efficiency of the internal combustion engine and a rotation speed of the internal combustion engine;

an exhaust-gas flow-rate computing section for calculating an exhaust-gas flow rate based on an air/fuel ratio of the internal combustion engine and an actual in-cylinder fresh-air amount;

a target compressor driving-force computing section for calculating a target compressor driving force based on a target value of an intake airflow rate and the target throttle-valve upstream pressure; and a wastegate-valve opening-degree computing section for calculating a wastegate-valve control value based on the exhaust-gas flow rate and the target compressor driving force, wherein the wastegate-valve control part uses a relationship of characteristics of the exhaust-gas flow rate and the target compressor driving force to calculate the wastegate-valve control value so as to control the wastegate-valve driving section, wherein the relationship varies based only on the wastegate-valve control value.

2. The control device for an internal combustion engine according to claim 1, wherein:
the wastegate-valve control part further includes a target inlet-manifold pressure computing section for calculating an actual volumetric-efficiency correction factor corresponding to a ratio of the intake airflow rate of air to be sucked into a cylinder based on the intake airflow rate, and on an inlet-manifold pressure and an intake-air temperature in the intake path so as to calculate a target inlet-manifold pressure based on the actual volumetric-efficiency correction factor and the intake-air temperature, the target value of the charging efficiency; and
the target throttle-valve upstream pressure computing section calculates the target throttle-valve upstream pressure based on the target inlet-manifold pressure including characteristics in which the throttle-valve upstream pressure becomes higher than the inlet-manifold pressure, a correction value based on the intake-air temperature and a correction value based on a water temperature detected by a water-temperature sensor of the cc of device.

3. The control device for an internal combustion engine according to claim 1, wherein:
the wastegate-valve control part further includes an actual compressor driving-force calculating section for calculating an actual compressor driving force based on a throttle-valve upstream pressure corresponding to an intake-air pressure on the upstream side of the throttle valve and the intake airflow rate; and
the wastegate-valve opening-degree computing section performs PID control in accordance with a difference between the actual compressor driving force and the target compressor driving force to calculate a feedback correction amount for the wastegate-valve control value.

4. The control device for an internal combustion engine according to claim 2, wherein:
the wastegate-valve control part further includes an actual compressor driving-force calculating section for calculating an actual compressor driving force based on a throttle-valve upstream pressure corresponding to an intake-air pressure on the upstream side of the throttle valve and the intake airflow rate; and
the wastegate-valve opening-degree computing section performs PID control in accordance with a difference between the actual compressor driving force and the target compressor driving force to calculate a feedback correction amount for the wastegate-valve control value.

5. The control device for an internal combustion engine according to claim 1, wherein the wastegate-valve opening-degree computing section calculates a feedback learning amount for the wastegate-valve control valve with respect to a quantitative deviation amount of the wastegate-valve control value so as to perform a learning correction on the actual compressor driving force and the wastegate-valve control value.

6. The control device for an internal combustion engine according to claim 2, wherein the wastegate-valve opening-degree computing section calculates a feedback learning amount for the wastegate-valve control valve with respect to a quantitative deviation amount of the wastegate-valve control value so as to perform a learning correction on the actual compressor driving force and the wastegate-valve control value.

7. The control device for an internal combustion engine according to claim 3, wherein the wastegate-valve opening-degree computing section calculates a feedback learning amount for the wastegate-valve control valve with respect to a quantitative deviation amount of the wastegate-valve control value so as to perform a learning correction on the actual compressor driving force and the wastegate-valve control value.

8. The control device for an internal combustion engine according to claim 4, wherein the wastegate-valve opening-degree computing section calculates a feedback learning amount for the wastegate-valve control valve with respect to a quantitative deviation amount of the wastegate-valve control value so as to perform a learning correction on the actual compressor driving force and the wastegate-valve control value.

9. The control device for an internal combustion engine according to claim 1, wherein each of the target compressor driving-force computing section, the exhaust-gas flow-rate computing section, and the actual compressor driving-force computing section calculates a correction ratio for a standard state of an atmospheric pressure and a correction ratio for a standard state of an intake-air temperature in the intake path so that the target compressor driving-force computing section, the exhaust-gas flow-rate computing section, and the actual compressor driving-force computing section respectively calculate the target compressor driving force, the exhaust-gas flow rate, and the actual compressor driving force by using environmental correction amounts corresponding to the calculated correction ratios.

10. The control device for an internal combustion engine according to claim 2, wherein each of the target compressor driving-force computing section, the exhaust-gas flow-rate computing section, and the actual compressor driving-force computing section calculates a correction ratio for a standard state of an atmospheric pressure and a correction ratio for a standard state of an intake-air temperature in the intake path so that the target compressor driving-force computing section, the exhaust-gas flow-rate computing section, and the actual compressor driving-force computing section respectively calculate the target compressor driving force, the exhaust-gas flow rate, and the actual compressor driving force by using environmental correction amounts corresponding to the calculated correction ratios.

11. The control device for an internal combustion engine according to claim 3, wherein each of the target compressor driving-force computing section, the exhaust-gas flow-rate computing section, and the actual compressor driving-force computing section calculates a correction ratio for a standard state of an atmospheric pressure and a correction ratio for a standard state of an intake-air temperature in the intake path so that the target compressor driving-force computing section, the exhaust-gas flow-rate computing section, and the actual compressor driving-force computing section respectively calculate the target compressor driving force, the exhaust-gas flow rate, and the actual compressor driving force by using environmental correction amounts corresponding to the calculated correction ratios.

12. The control device for an internal combustion engine according to claim 4, wherein each of the target compressor driving-force computing section, the exhaust-gas flow-rate computing section, and the actual compressor driving-force computing section calculates a correction ratio for a standard state of an atmospheric pressure and a correction ratio for a standard state of an intake-air temperature in the intake path so that the target compressor driving-force computing section, the exhaust-gas flow-rate computing section, and the actual compressor driving-force computing section respectively calculate the target compressor driving force, the exhaust-gas flow rate, and the actual compressor driving force by using environmental correction amounts corresponding to the calculated correction ratios.

13. The control device for an internal combustion engine according to claim 1, wherein:
the wastegate-valve driving section comprises a pressure-type wastegate valve; and
the wastegate-valve control part controls a duty ratio of the wastegate valve, for controlling a pressure to be applied to a diaphragm of the wastegate valve with the wastegate-valve control value.

14. The control device for an internal combustion engine according to claim 2, wherein:
the wastegate-valve driving section comprises a pressure-type wastegate valve; and
the wastegate-valve control part controls a duty ratio of the wastegate valve, for controlling a pressure to be applied to a diaphragm of the wastegate valve with the wastegate-valve control value.

15. The control device for an internal combustion engine according to claim 3, wherein:
the wastegate-valve driving section comprises a pressure-type wastegate valve; and
the wastegate-valve control part controls a duty ratio of the wastegate valve, for controlling a pressure to be applied to a diaphragm of the wastegate valve with the wastegate-valve control value.

16. The control device for an internal combustion engine according to claim 1, wherein:
the wastegate-valve driving section comprises an electric-type wastegate valve; and
the wastegate-valve control part controls an opening degree of the wastegate valve with the wastegate-valve control value.

17. The control device for an internal combustion engine according to claim 2, wherein:
the wastegate-valve driving section comprises an electric-type wastegate valve; and
the wastegate-valve control part controls an opening degree of the wastegate valve with the wastegate-valve control value.

18. The control device for an internal combustion engine according to claim 3, wherein:
the wastegate-valve driving section comprises an electric-type wastegate valve; and
the wastegate-valve control part controls an opening degree of the wastegate valve with the wastegate-valve control value.

19. A control method for an internal combustion engine including: a throttle valve provided in an intake path of the internal combustion engine; a supercharger including a turbine provided in an exhaust path and a compressor provided in the intake path on an upstream side of the throttle valve, for rotating integrally with the turbine; a wastegate valve provided in a bypass passage for bypassing the turbine; and a wastegate-valve driving section for driving the wastegate valve to change a flow-path sectional area of the bypass passage, the control method comprising:
calculating a target throttle-valve upstream pressure corresponding to a target value of a pressure on the upstream side of the throttle valve based on a target value of a charging efficiency of the internal combustion engine and a rotation speed of the internal combustion engine;
calculating an exhaust-gas flow rate based on an air/fuel ratio of the internal combustion engine and an actual in-cylinder fresh-air amount;
calculating a target compressor driving force based on a target value of an intake airflow rate and the target throttle-valve upstream pressure; and
calculating a wastegate-valve control value (WG) based on the exhaust-gas flow rate and the target compressor driving force,
wherein a relationship of characteristics of the exhaust-gas flow rate and the target compressor driving force is used to calculate the wastegate-valve control value so as to control the wastegate-valve driving section,
wherein the relationship varies based only on the wastegate-valve control value.

* * * * *